UNITED STATES PATENT OFFICE.

LEO H. BAEKELAND, OF YONKERS, NEW YORK.

METHOD OF MAKING INSOLUBLE PRODUCTS OF PHENOL AND FORMALDEHYDE.

942,699.

Specification of Letters Patent.   Patented Dec. 7, 1909.

No Drawing.   Application filed July 13, 1907.   Serial No. 383,684.

*To all whom it may concern:*

Be it known that I, LEO H. BAEKELAND, a citizen of the United States, residing at Snug Rock, Harmony Park, Yonkers, in the county of Westchester and State of New York, have invented certain new and useful Improvements in Methods of Making Insoluble Condensation Products of Phenols and Formaldehyde, of which the following is a specification.

In my prior application Ser. No. 358,156, filed February 18, 1907, I have described and claimed a method of indurating fibrous or cellular materials which consists in impregnating or mixing them with a phenolic body and formaldehyde, and causing the same to react within the body of the material to yield an insoluble indurating condensation product, the reaction being accelerated if desired by the use of heat or condensing agents. In the course of this reaction considerable quantities of water are produced, and a drying operation is resorted to to expel it.

The present invention relates to the production of hard, insoluble and infusible condensation products of phenols and formaldehyde.

In practicing the invention I react upon a phenolic body with formaldehyde to obtain a reaction product which is capable of transformation by heat into an insoluble and infusible body, and then convert this reaction product, either alone or compounded with a suitable filling material, into such insoluble and infusible body by the combined action of heat and pressure. Preferably the water produced during the reaction or added with the reacting bodies is separated before hardening the reaction product. By proceeding in this manner a more complete control of the reaction is secured and other important advantages are attained as hereinafter set forth.

If a mixture of phenol or its homologues and formaldehyde or its polymers be heated, alone or in presence of catalytic or condensing agents, the formaldehyde being present in about the molecular proportion required for the reaction or in excess thereof, that is to say, approximately equal volumes of commercial phenol or cresylic acid and commercial formaldehyde, these bodies react upon each other and yield a product consisting of two liquids which will separate or stratify on standing. The lighter or supernatant liquid is an aqueous solution, which contains the water resulting from the reaction or added with the reagents, whereas the heavier liquid is oily or viscous in character and contains the first products of chemical condensation or dehydration. The liquids are readily separated, and the aqueous solution may be rejected or the water may be eliminated by evaporation. The oily liquid obtained as above described is found to be soluble in or miscible with alcohol, acetone, phenol and similar solvents or mixtures of the same. This oily liquid may be further submitted to heat on a water- or steam-bath so as to thicken it slightly and to drive off any water which might still be mixed with it. If the reaction be permitted to proceed further the condensation product may acquire a more viscous character, becoming gelatinous, or semi-plastic in consistence. This modification of the product is insoluble or incompletely soluble in alcohol but soluble or partially soluble in acetone or in a mixture of acetone and alcohol. The condensation product having either the oily or semi-plastic character may be subjected to further treatment as hereinafter described. By heating the said condensation product it is found to be transformed into a hard body, unaffected by moisture, insoluble in alcohol and acetone, infusible, and resistant to acids, alkalies and almost all ordinary reagents. This product is found to be suitable for many purposes, and may be employed either alone or in admixture with other solid, semi-liquid or liquid materials, as for instance asbestos fiber, wood fiber, other fibrous or cellular materials, rubber, casein, lamp black, mica, mineral powders as zinc oxid, barium sulfate, etc., pigments, dyes, nitrocellulose, abrasive materials, lime, sulfate of calcium, graphite, cement, powdered horn or bone, pumice stone, talcum, starch, colophonium, resins or gums, slate dust, etc., in accordance with the particular uses for which it is intended, and in much the same manner as india rubber is compounded with the above-named and other materials to yield various valuable products. In compounding the condensation or dehydration product in this manner the desired materials are mixed with the same before submitting it to the final hardening operation below described.

In order to convert the condensation or dehydration product into the final product above-described I may subject it to a temperature which will depend upon the specific results sought. If it be desired to mold the material directly the condensation product is poured or pressed into a suitable mold and is submitted therein while maintaining appropriate pressure to a suitable temperature, say about 110–140° C.; under these conditions there is obtained in from one to two hours or less a hard, compact, perfectly homogeneous mass similar in its properties to hard rubber or to ivory, insoluble in alcohol, acetone, and resistant to heat or infusible, and resistant to moisture and most chemical reagents as above described. In case the product be first mixed with asbestos fiber, rubber, powdered substances or other materials as above described, and heat be thereafter applied a compound is obtained in the form of hard masses containing the insoluble condensation product described. Such masses may be produced directly in any desired form by the use of a suitable mold, or they may be produced in a block or irregular mass which may be cut, sawed, turned or otherwise manipulated to any suitable form or size.

Small proportions of solvents may be added to the initial condensation product in order to facilitate the compounding or mixing of the same, the resulting mixture being then submitted to the final baking or hardening process as described.

While I have indicated above a practical hardening temperature of 110–140° C. it should be understood that higher temperatures may be employed, in which case the time required for the hardening process is considerably reduced; the hardening may also be conducted at 100° C. and even at lower temperatures, more particularly for impregnating fibrous or cellular materials, but in this case the hardening is found to be very slow and some days may be required for its completion. The hardening may be greatly accelerated by adding small proportions of catalytic agents, or so-called condensing agents, as for instance zinc chlorid, other metallic chlorids, acids or salts. In case such condensing agents are added the hardening occurs rapidly at relatively low temperatures.

The mode of application or compounding of the condensation product will of course depend upon the results sought. For treating or indurating wood, the surface only may be treated, or it may be treated throughout its mass substantially as described in my copending application above referred to; the treated material is thereafter submitted to heat, some condensing agent being added if desired. For facilitating the penetration of wood or the like the condensation product may be slightly heated to render it more mobile, or small proportions of suitable solvents may be added.

The final heating or baking by which the condensation product, alone or compounded, is converted into an insoluble body should be effected in a closed vessel in case the temperature exceed 90°–100° C.; without this precaution vapors of formaldehyde and the like escape causing foam and air bubbles; and furthermore the loss of the reagents and the disturbance of the proportions between them prevents obtaining a product of maximum hardness and uniform texture. In a closed vessel under pressure the operation proceeds with precision, and a uniform result may be always obtained.

Instead of ordinary phenol I may use cresol and its homologues, or other phenolic bodies. If desired I may employ in place of commercial formaldehyde a solution of anhydrous formaldehyde in phenol; or the polymer of formaldehyde which on heating splits up into anhydrous formaldehyde, may be used.

The initial oily, viscous or semi-plastic condensation product may be obtained in various ways, as for instance by digesting a suitable mixture of phenol and formaldehyde in an autoclave, or merely by boiling a mixture of the same in an open vessel provided with a return condenser in order to avoid loss and variation of proportions. A very small proportion of mineral or organic acid, or of zinc chlorid, calcium chlorid, or other salt or agent favoring condensation may be added to the mixture, the proportion being in all cases so small as to avoid such energetic reaction as will not permit the intermediate oily, viscous or semi-plastic condensation product to be obtained. Or I may add a solid salt as for instance calcium chlorid to the mixture of phenol and formaldehyde in which case the calcium chlorid immediately absorbs water and forms two distinct layers, the lower one being formed by a very dense aqueous solution of calcium chlorid, the upper one by the dehydrated mixture.

I claim:

1. The method of producing a hard, compact, insoluble and infusible condensation product of phenols and formaldehyde, which consists in reacting upon a phenolic body with formaldehyde, and then converting the product into a hard, insoluble and infusible body by the combined action of heat and pressure.

2. The method of making articles containing an insoluble and infusible condensation product of phenols and formaldehyde, which consists in reacting on a phenolic body with formaldehyde, producing thereby a reaction product capable of transformation by heat into an insoluble and infusible body, forming the article from said reaction product, and rendering the article hard, insoluble and infusible by application of heat and pressure.

3. The method of making articles containing an insoluble and infusible condensation product of phenols and formaldehyde, which consists in reacting on a phenolic body with formaldehyde, producing thereby a reaction product capable of transformation by heat into an insoluble and infusible body, separating water from the resulting product, forming the article from said reaction product, and rendering the article hard, insoluble and infusible by application of heat and pressure.

4. The method of making articles containing an insoluble and infusible condensation product of phenols and formaldehyde, which consists in reacting on a phenolic body with formaldehyde, producing thereby a reaction product capable of transformation by heat into an insoluble and infusible body, forming the article from said reaction product compounded with a filling material, and rendering the article hard, insoluble and infusible by application of heat and pressure.

5. In a method of making articles containing an insoluble and infusible condensation product of phenols and formaldehyde, the step which consists in causing the water to separate from the mixture of a phenolic body and an aqueous solution of formaldehyde by adding to said mixture a metallic salt soluble in water and adapted to cause such separation.

In testimony whereof, I affix my signature in presence of two witnesses.

LEO H. BAEKELAND.

Witnesses:
 FRED R. CAREY,
 HARRY S. TARBELL.